United States Patent [19]
Chaney

[11] Patent Number: 5,502,610
[45] Date of Patent: Mar. 26, 1996

[54] SWITCHING REGULATOR HAVING HIGH CURRENT PREVENTION FEATURES

[75] Inventor: Steve I. Chaney, Pleasanton, Calif.

[73] Assignee: Micrel, Inc., San Jose, Calif.

[21] Appl. No.: 116,427

[22] Filed: Sep. 2, 1993

[51] Int. Cl.$^6$ .................................................. H02M 3/335
[52] U.S. Cl. ................................................. 361/18; 361/93
[58] Field of Search ................................. 361/93, 18, 94, 361/98, 100, 110; 323/290, 908

[56] References Cited

U.S. PATENT DOCUMENTS

| 4,286,175 | 8/1981 | Baker | 307/581 |
| 4,719,553 | 1/1988 | Hinckley | 323/49 |
| 4,792,746 | 12/1988 | Josephson | 323/290 |
| 5,144,547 | 9/1992 | Masamoto | 363/127 |

*Primary Examiner*—A. D. Pellinen
*Assistant Examiner*—S. Jackson
*Attorney, Agent, or Firm*—Skjerven, Morrill, MacPherson, Franklin & Friel; Brian D. Ogonowsky

[57] ABSTRACT

A switching circuit has a pull-up FET and a pull-down FET coupled to a load circuit, each FET having a control terminal coupled to a current regulating circuit. The current regulating circuit provides a high predetermined current for a relatively short duration to the gates of the FETs to quickly turn on or turn off the FETs. After the short duration, a low quiescent current is applied to the gates to maintain the FETs in their present states. An inhibiting circuit, coupled between the pull-up FET and the pull-down FET, detects the states of the FETs and delays turn-on of one FET until the other FET has turned off. An overcurrent circuit monitors a current through a switching FET and turns off the FET after a predetermined time delay when an overcurrent condition is detected. The overcurrent circuit then turns on the FET after another predetermined time delay.

12 Claims, 2 Drawing Sheets

SWITCHING REGULATOR HAVING HIGH CURRENT PREVENTION FEATURES

BACKGROUND OF THE INVENTION

1. Field of the Invention

The invention relates to a method and apparatus for switching currents.

2. Description of the Related Art

In a switching voltage regulator application, there is a need to drive loads at varying current levels and at relatively high switching speeds. A current switching circuit in a switching regulator should have low power dissipation and be able to be switched at high speeds.

In a conventional type of switching circuit shown in FIG. 2, a load 2 is coupled to two field effect transistors (FETs) 4 and 6, each selectively switched on and off by control logic 8 to drive load 2 at a certain current level determined by current limiting resistors 10 and 12. Control logic 8 responds to input signals IN1 and IN2.

Consider the case where load 2 is presently driven low by the "on" state of FET 6, with FET 4 in the "off" state, and it is now desired to drive the load 2 high. Input signals IN1 and IN2 appropriate to the configuration of FET 6 "off" and FET 4 "on" are received by control logic 8 to initiate the switching. Control logic 8 then drives the gate of FET 4 high and the gate of FET 6 low.

In prior art switching circuits, as illustrated in FIG. 2, gates of FETs 4 and 6 are directly coupled to circuits in control logic 8 which output a fixed voltage to charge the gates of FETs 4 and 6. For the turn-on of FET 4 or FET 6, there is a delay incurred while building up charge on the gate of FET 4 or FET 6 to the level required for turn-on of FET 4 or FET 6. A similar delay is incurred during turn-off of FET 4 or FET 6, where the gate must be discharged before reaching the level for turn-off. It is desirable to reduce the delay associated with gate charge build up and gate discharging in the switching transistors to obtain faster switching.

During switching from the FET 4 off/FET 6 on states to the FET 4 on/FET 6 off states, there is a period of time when both FETs 4 and 6 are simultaneously on, or partially on, due to the delay in transitions between the off and on states. During this time period, the circuit is subject to cross-conduction, wherein current flows through the channels of both FETs 4 and 6, unnecessarily dissipating power, and stressing circuit elements. It is therefore desirable to eliminate cross-conduction in switching circuits in order to conserve power and protect circuit elements.

For a load 2 which draws large inrush currents, such as a capacitive load or incandescent lamp, both load and switching circuit elements may be damaged during the initial surge of current. It is therefore desirable to protect circuit elements in a switching regulator from such inrush currents.

SUMMARY

It is one object of the present invention to increase the switching speed of a switching circuit.

The above object is achieved in a switching circuit having a pull-up FET and a pull-down FET coupled to a load circuit, each FET having a control terminal coupled to a current regulating circuit. The current regulating circuit provides a high predetermined current for a relatively short duration to the gates of the FETs to quickly turn on or turn off the FETs. After the short duration, a low quiescent current is applied to the gates to maintain the FETs in their present states.

It is also an object of the present invention to eliminate cross-conduction in switching circuits.

The above object is achieved by having an inhibiting circuit coupled between the pull-up FET and the pull-down FET. The inhibiting circuit detects the states of the FETs and delays turn-on of one FET until the other FET has turned off.

It is a further object of the invention to provide a switching circuit capable of handling high inrush currents while regulating power consumption and protecting switching and load circuit elements.

The above object is achieved in a switching circuit having an overcurrent circuit monitoring a current through a switching FET and turning off the FET after a predetermined time delay when an overcurrent condition is detected. The overcurrent circuit then turns on the FET after another predetermined time delay. The second time delay can be controlled to regulate power consumption.

DETAILED DESCRIPTION OF THE PREFERRED EMBODIMENT

Figure 1:
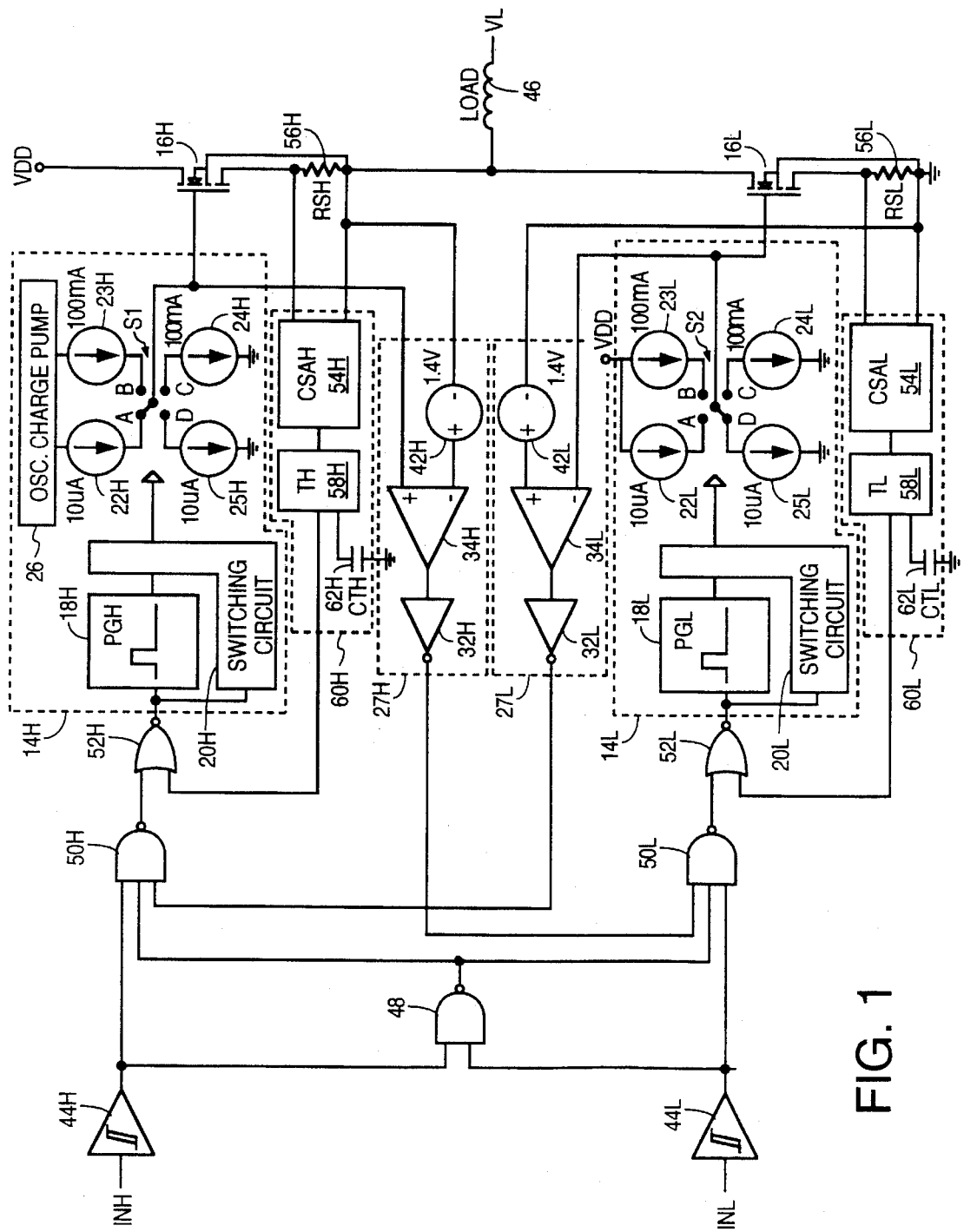
FIG. 1 is a schematic diagram incorporating one embodiment of the invention.
Figure 2:
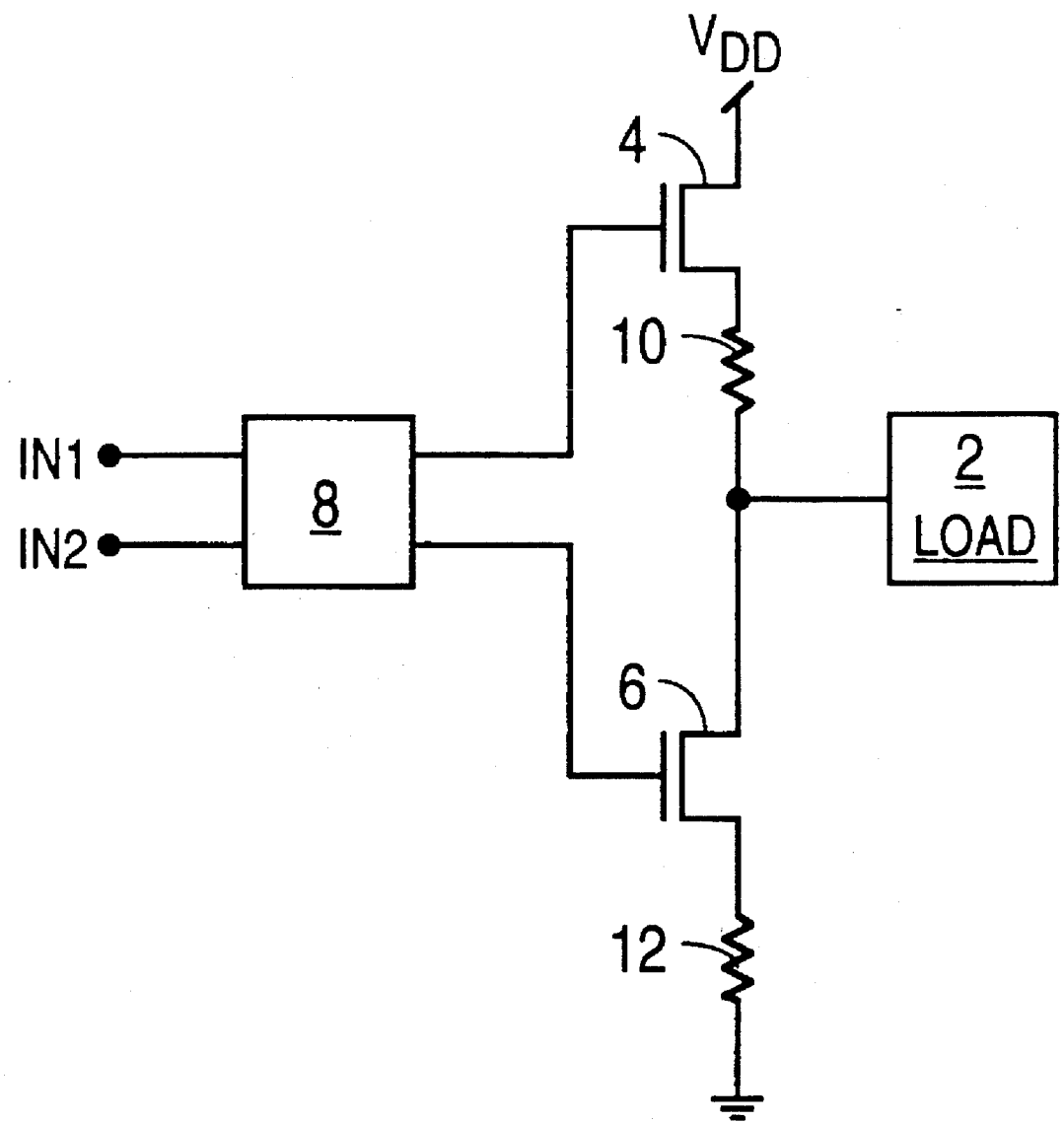
FIG. 2 is a schematic diagram of a prior art switching circuit.

In FIG. 1, the H and L suffix denote high side and low side circuit elements, where the H elements pertain to circuit structures for driving a load high, and the L elements pertain to circuit structures for driving a load low.

Current regulating circuits 14H and 14L provide voltage/current to the gates of respective drive transistors 16H and 16L in response to input signals INH and INL.

Inhibiting circuits 27H and 27L monitor the states of respective transistors 16H and 16L and provide input signals to current regulating circuits 14L and 14H, respectively, to inhibit the turn-on of transistor 16H or 16L to prevent cross-conduction.

Overcurrent circuits 60H and 60L detect overcurrents through transistors 16H and 16L, respectively, and provide input signals to current regulating circuits 14H and 14L, respectively, to temporarily turn-off transistor 16H or 16L.

Two input buffers 44H and 44L receive signals INH and INL, respectively, for controlling the transistors 16H and 16L in order to drive load 46 high or low. The outputs of buffers 44H and 44L are applied to NAND gate 48, and the respective outputs are applied to NAND gates 50H and 50L.

In describing the operation of the circuit of FIG. 1, it will be assumed that the transistors 16H and 16L are initially in their off states.

When inputs INH and INL are both low, the NAND gate 48 output is high. NAND gates 50H and 50L will both have high outputs since each has one low input from INH and INL. This provides high inputs to both NOR gates 52H and 52L, causing a low signal to be applied to pulse generators 18H, 18L and switching logic 20H, 20L. Switching logic 20H and 20L respond by setting switches S1 and S2 to respective positions D, causing low current sources 25H and 25L to discharge gates of FET transistors 16H and 16L with small 10 μA currents, thereby maintaining them in the off state. Switches S1 and S2 may be conventional transistor switches. Switching logic 20H and 20L may use conventional logic techniques for controlling switches S1 and S2 to be in any one of four positions A–D based upon a last switching state and a newly received high or low output from NOR gates 52H or 52L.

A conventional oscillator charge pump 26 is used to generate the currents for each of the various current sources.

Transistors 16H and 16L are prevented from being turned on simultaneously using NAND gate 48. NAND gate 48 prevents the illegal input of INH and INL both high. When INH and INL are both high, NAND gate 48 outputs a low signal to NAND gates 50H and 50L. A low input to NAND gates 50H and 50L results in high inputs to NOR gates 52H and 52L. Consequently, NOR gates 52H and 52L output low signals to both current regulating circuits 14H and 14L to prevent the turn-on of transistor 16H or 16L when input signals INH and INL are both high.

When INH is high and INL is low, following the INH low and INL low initial condition (both transistors initially off), input buffer 44H sends a high signal to NAND gates 48 and 50H, while input buffer 44L sends a low signal to NAND gates 48 and 50L. The NAND gate 48 output is therefore high, since an input from buffer 44L is low. Meanwhile, since transistor 16L is off, its gate to source voltage is lower than a predetermined voltage, which in a preferred embodiment is 1.4 volts. Amplifier 34L of inhibiting circuit 27L receives the gate voltage of transistor 16L at a non-inverting input and a 1.4 volt voltage source 42L at an inverting input. The amplifier 34L output will thus be low. This low signal is applied to an inverting buffer 32L, providing a high input to NAND gate 50H. The NAND gate 50H inputs are all high, resulting in a low output to an input terminal of NOR gate 52H. Since transistor 16H was initially off, there is no current flowing through resistor 56H, and therefore no overcurrent condition, resulting in overcurrent circuit 60H maintaining a low input to NOR gate 52H. (Overcurrent circuit 60H will be discussed in detail later.) Since both inputs to NOR gate 52H are low, a high output signal is received by both pulse generator 18H and switching logic 20H.

Pulse generator 18H generates an 800 ns pulse on the rising edge of the high output from NOR gate 52H. Switching logic 20H receives the 800 ns pulse and the high output from NOR gate 52H. For the duration of the pulse, switching logic 20H sets the switch S1 to position B, from the initial position D. This couples a large 100 mA current from current source 23H to the gate of transistor 16H to rapidly switch it on. At the end of the 800 ns pulse, switching logic 20H sets switch S1 to position A, coupling a small 10 µA current from current source 22H to the transistor 16H gate, thus maintaining a steady state on condition for transistor 16H by compensating for gate to source leakage currents.

As discussed above in connection with low input levels for both INH and INL, a low INL input causes a high output from NAND gate 50L, resulting in a low output from NOR gate 52L. This maintains switch S2 at position D to maintain the discharging of the gate of transistor 16L using current source 25L to keep transistor 16L in the off state.

From the symmetrical nature of the circuit level diagram of FIG. 1, it can be seen that going from the INH low/INL low to the INH low/INL high configuration is similar to the above discussed INH high/INL low operation.

For the situation in which one of transistors 16H or 16L is to be switched from an on state to an off state (such as INH high/INL low to INH low/INL high), it suffices to discuss one scenario, since the operations of the high side circuits and low side circuits are symmetrical.

For the INH high/INL low (discussed above) to INH low/INL high transition, NAND gate 50H receives a low input from input buffer 44H and provides a high output to an input terminal of NOR gate 52H. The NOR gate 52H output will then be low. For currents below a predetermined threshold level, as detected by current sense amplifier 54H, NOR gate 52H will receive a low input from timer circuit 58H. Pulse generator 18H generates an 800 ns pulse at the falling edge of the NOR gate 52H output, and switching logic 20H sets switch S1 to position C for the duration of the pulse, coupling a large 100 mA current from current source 24H to the gate of transistor 16H for fast turn off. At the end of the pulse, switching logic 20H sets switch S1 to position D to couple a small 10 µA current from current source 25H to the gate of transistor 16H to maintain the off condition.

Meanwhile, the INL high signal is fed to NAND gate 50L from input buffer 44L. NAND gate 48 also provides a high input to NAND gate 50L. Inhibiting circuit 27H provides an input signal to the NAND gate 50L depending on the state of transistor 16H, which is changing from the on state to the off state as described above. Initially, the signal from buffer inverter 32H is low, since transistor 16H is initially on (gate voltage greater than 1.4 volts) and amplifier 34H outputs a high voltage. A low input to NAND gate 50L results in a high signal being applied to NOR gate 52L, which in turn outputs a low signal to pulse generator 18L and switching logic 20L. This inhibits the turn-on of transistor 16L by maintaining switch S2 in position D until after the transistor 16H gate voltage is below 1.4 volts. At such time, transistor 16H will be in the "off" state, the inverter 32H output will be high, and pulse generator 18L and switching logic 20L will receive a high output from NOR gate 52L. Pulse generator 18L responds by generating a 800 ns pulse on the rising edge of the NOR gate 52L output. Switching logic 20L sets switching means S2 to position B for the duration of the pulse, coupling a large 100 mA current from current source 23L to the gate of transistor 16L for fast turn-on of transistor 16L. At the end of the pulse, switching logic 20L sets switch S2 to position A to maintain the on state of transistor 16L. Cross-conduction is eliminated since the transistors 16H and 16L are prevented from being on at the same time. Furthermore, since transistors 16H and 16L do not interact, there is no need to match their impedances.

From the above description, a truth table for the operation of switching logic 20H and 20L can be easily prepared, and conventional sequential logic techniques can be used to implement the truth table.

Sustained overcurrents caused by high inrush currents during switching are prevented by overcurrent circuits 60H and 60L. It suffices to discuss the operation of overcurrent circuit 60H, since overcurrent circuit 60L functions in the same fashion for respective low side circuit elements.

In a preferred embodiment, timer circuit 58H, in most circumstances, provides a low input to NOR gate 52H, unless an overcurrent condition occurs wherein the current through resistor 56H causes a voltage across resistor 56H in excess of, for example, 46 millivolts. This voltage is detected by current sense amplifier 54H. When current through resistor 56H results in a voltage drop greater than 46 millivolts, current sense amplifier 54H signals to timer circuit 58H to apply a high signal to NOR gate 52H after a predetermined delay, which in a preferred embodiment is about 4 µs. Thus, about 4 µs after an overcurrent condition is detected, the NOR gate 52H output will become low, shutting off transistor 16H in a manner similar to an INH low condition, thereby protecting transistor 16H and load 46 from the overcurrent.

Timer circuit 58H then outputs a low signal to NOR gate 52H after a specified delay to reactivate transistor 16H. The length of the turn-on delay is directly proportional to the value of capacitor 62H, which can be varied depending on the magnitude and length of anticipated inrush currents. In one embodiment, for a capacitor 62H value of 100 pF, the turn-on delay is approximately 95 μs.

While the embodiment of FIG. 1 shows a current regulating circuit 14H as including elements 18H, 20H, 22H–25H, and S1, other means for regulating varying levels of current over predetermined time periods in response to an input signal can be utilized as a current regulating circuit in another embodiment of the invention.

Similarly, while the embodiment of FIG. 1 shows an inhibiting circuit 27H including elements 32H, 34H and 42H, other means capable of detecting the state of a transistor and providing a corresponding output signal can be used as an inhibiting circuit in another embodiment of the invention.

Also, while overcurrent circuit 60H is shown to include elements 54H, 58H and 62H, other means for detecting an overcurrent can be utilized as an overcurrent circuit in another embodiment of the invention.

Although the switching circuit has been shown advantageous when switching FETs, other technologies, such as bipolar and Schottky, may also benefit from the improved switching techniques described herein.

While the present invention is illustrated with particular embodiments, the invention is intended to include all variations and modifications falling within the scope of the appended claims.

What is claimed is:

1. A switching circuit comprising:

a first transistor having a first terminal for conducting load current to a load circuit, and a second terminal coupled to receive a first voltage; and a current regulating circuit, said current regulating circuit having an output terminal coupled to a control terminal of said first transistor, said current regulating circuit having an input terminal for receiving an input signal, said current regulating circuit comprising:

a first current source for generating a first constant current;

a second current source for generating a second constant current;

one or more switches connected to said first current source, said second current source, and said control terminal of said first transistor; and a timer connected to said one or more switches for controlling said one or more switches to couple said first constant current to said control terminal of said first transistor for a first predetermined period of time in response to said input signal to switch said first transistor to a first state, and, after said first predetermined period of time, controlling said one or more switches to only couple said second constant current to said control terminal of said first transistor to maintain said first transistor in said first state, said second constant current being substantially less than said first constant current.

2. The switching circuit of claim 1 wherein said current regulating circuit further comprises:

a pulse generator connected to said input terminal, said pulse generator for generating a pulse of a predetermined duration in response to said input signal received by said input terminal; and a switching circuit coupled to an output of said pulse generator for generating a first control signal during said pulse, said one or more switches being coupled to said switching circuit, said one or more switches connecting an output of said first current source to said control terminal of said first transistor in response to said first control signal, said one or more switches connecting an output of said second current source to said control terminal after said predetermined duration.

3. The switching circuit of claim 2 wherein said first transistor is a FET.

4. The switching circuit of claim 1 further comprising:

a second transistor having a first terminal for conducting load current to said load circuit and a second terminal coupled to receive a second voltage; and an inhibiting circuit coupled to said first transistor and said second transistor, said inhibiting circuit detecting an on state of said second transistor and inhibiting turn-on of said first transistor until said second transistor has been turned off.

5. The switching circuit of claim 3 wherein said first transistor and said second transistor are both FETs.

6. The switching circuit of claim 1 further comprising:

an overcurrent circuit coupled between said first terminal of said first transistor and said input terminal of said current regulator circuit, wherein when a current level detected by said overcurrent circuit exceeds a predetermined threshold value, said overcurrent circuit turns off said first transistor after a second predetermined period and turns back on said first transistor after a third predetermined period.

7. The switching circuit of claim 6 wherein said second predetermined period is approximately 4 μs.

8. The switching circuit of claim 1 wherein said first transistor is a FET.

9. The switching circuit of claim 1 wherein said current regulating circuit further comprises:

a third current source for generating a third constant current, said third constant current being of a direction opposite to a direction of said first constant current;

a fourth current source for generating a fourth constant current, said fourth constant current being of a direction opposite to a direction of said second constant current;

said one or more switches being connected to said third current source and said fourth current source;

said timer also for controlling said one or more switches to couple said third constant current to said control terminal of said first transistor for a second predetermined period in response to said input signal to switch said first transistor to a second state, and, after said second predetermined period, controlling said one or more switches to only couple said fourth constant current to said control terminal of said first transistor to maintain said first transistor in said second state, said fourth constant current being substantially less than said third constant current.

10. The switching circuit of claim 9 wherein said first predetermined period and said second predetermined period are the same.

11. A switching circuit comprising:

a first transistor having a first terminal for conducting load current to a load circuit, and a second terminal coupled to receive a first voltage;

a current regulating circuit, said current regulating circuit having an output terminal coupled to a control terminal of said first transistor, said current regulating circuit having an input terminal lot receiving an input signal, wherein said current regulating circuit provides a first current to said control terminal of said first transistor for a first period of time in response to said input signal to switch said first transistor to a first state, and wherein said current regulating circuit provides a second current to said first transistor control terminal after said first period of time to maintain said first transistor in said first state, said second current being substantially less than said first current;

a second transistor having a first terminal for conducting load current to said load circuit and a second terminal coupled to receive a second voltage; and an inhibiting circuit coupled to said first transistor and said second transistor, said inhibiting circuit detecting an on state of said second transistor and inhibiting turn-on of said first transistor until said second transistor has been turned off, said inhibiting circuit comprising:

a comparing circuit having a first input terminal, a second input terminal, and an output terminal, said comparing circuit receiving an input voltage on said first input terminal, a magnitude of said input voltage corresponding to a state of said second transistor; and a voltage source coupled to said second input terminal of said comparing circuit, said voltage source supplying a fixed reference voltage, wherein said comparing circuit outputs at said output terminal a first signal for inhibiting turn-on of said first transistor when said input voltage exceeds said reference voltage.

12. The switching circuit of claim 4 wherein said first transistor and said second transistor are both FETs.

* * * * *